United States Patent
Deng et al.

(10) Patent No.: US 11,657,091 B2
(45) Date of Patent: May 23, 2023

(54) METHOD AND APPARATUS FOR QUERYING SHORTEST PATH OF GRAPH, AND STORAGE MEDIUM

(71) Applicant: BEIJING BAIDU NETCOM SCIENCE AND TECHNOLOGY CO., LTD., Beijing (CN)

(72) Inventors: Le Deng, Beijing (CN); Kunbin Chen, Beijing (CN); Jun Fang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 289 days.

(21) Appl. No.: 16/986,120

(22) Filed: Aug. 5, 2020

(65) Prior Publication Data

US 2021/0089580 A1 Mar. 25, 2021

(30) Foreign Application Priority Data

Sep. 24, 2019 (CN) .......................... 201910904822.5

(51) Int. Cl.
*G06F 16/901* (2019.01)
*G06F 16/2455* (2019.01)
*G06F 16/28* (2019.01)

(52) U.S. Cl.
CPC .... *G06F 16/9024* (2019.01); *G06F 16/24558* (2019.01); *G06F 16/288* (2019.01)

(58) Field of Classification Search
CPC ............ G06F 16/9027; G06F 16/9024; G06F 16/24558; G06F 16/288
(Continued)

(56) References Cited

U.S. PATENT DOCUMENTS

2010/0158528 A1 6/2010 Resende et al.
2013/0339352 A1* 12/2013 Jin ....................... G06F 16/9024
707/736
(Continued)

FOREIGN PATENT DOCUMENTS

CN 103186690 A 7/2013
CN 107018074 A 8/2017
(Continued)

OTHER PUBLICATIONS

Chinese Patent Application No. 201910904822.5, Office Action dated Nov. 19, 2021, 7 pages.
(Continued)

*Primary Examiner* — Giovanna B Colan
(74) *Attorney, Agent, or Firm* — Cozen O'Connor

(57) ABSTRACT

The present disclosure provides a method and an apparatus for querying the shortest path of a graph, and a storage medium. The method includes: performing a breadth-first search in a distributed graph database with a start entity to be searched and an end entity to be searched as root nodes respectively, and obtaining a layer of new entities for each search; performing an intersection checking on the new entities and entities of the highest layer from a search set on an opposite side, so as to determine whether an intersection between the new entities and the entities of the highest layer exists; and when the intersection exists, determining intersection points, and performing path backtracking through the intersection points to find the shortest path from the start entity to the end entity.

11 Claims, 5 Drawing Sheets

(58) Field of Classification Search
USPC .......................................................... 707/798
See application file for complete search history.

(56) References Cited

U.S. PATENT DOCUMENTS

| | | | | |
|---|---|---|---|---|
| 2015/0269494 A1* | 9/2015 | Kardes | .................. | G06F 16/355 |
| | | | | 706/12 |
| 2017/0060958 A1* | 3/2017 | Van Rest | ............ | G06F 16/9024 |
| 2019/0310970 A1* | 10/2019 | Braghin | .............. | G06F 16/2228 |
| 2020/0151216 A1* | 5/2020 | Sevenich | ............ | G06F 16/2219 |
| 2021/0055947 A1* | 2/2021 | Mahajan | ............. | G06F 9/45558 |

FOREIGN PATENT DOCUMENTS

| | | | | | |
|---|---|---|---|---|---|
| CN | 108073711 A | * | 5/2018 | ........... | G06F 16/288 |
| JP | 2020135207 A | * | 8/2020 | ......... | G06F 16/2237 |

OTHER PUBLICATIONS

Chinese Patent Application No. 201910904822.5, English translation of Office Action dated Nov. 19, 2021, 4 pages.
Gao, L., et al "Application of bidirectionalspan searched algorithm to automatic generating of interlocked path" Popularization and Application, 2007, vol. 16 No. 5: pp. 43-45.

* cited by examiner

US 11,657,091 B2

METHOD AND APPARATUS FOR QUERYING SHORTEST PATH OF GRAPH, AND STORAGE MEDIUM

CROSS-REFERENCE TO RELATED APPLICATION

The present application is based upon and claims priority to Chinese Patent Application No. 201910904822.5, filed on Sep. 24, 2019, the entire contents of which are incorporated herein by reference.

TECHNICAL FIELD

The present disclosure relates to a field of virtual network technology, and more particularly, to a method and apparatus for querying the shortest path of a graph, and to a storage medium.

BACKGROUND

The implementation of graph database products requires the support of graph calculation algorithms. The shortest path is one of such graph calculation algorithms. In the existing graph database engines, usually, the shortest path algorithm used in the master-slave mode is only applied to a stand-alone device, and distributed graph databases often lack the support and optimization of the shortest path algorithm for large-scale data volumes.

In the related art, the algorithm of the shortest path of the distributed graph database usually adopts the Dijkstra algorithm. In a distributed scenario, the algorithm is downgraded to a one-way breadth-first algorithm. In order to adapt to the data retrieval of distributed storage, one-way breadth-first search uses a plurality of threads to search the nodes of each layer. Each thread searches for entities of the next layer expanded by entities of the current layer, and determines whether it contains end entities.

However, the current problem is that the time consumed by the above shortest path algorithm increases exponentially as the number of path layer increases. For example, when the average access degree of each entry is 10, the time for the shortest path retrieval of three degrees exceeds one second, and the increase of the number of layers cause the consumption time to increase rapidly. Regardless of the increase in the access degree of entity or the increase in the number of layers, the above shortest path algorithm cannot satisfy the efficient mining in the case of distributed graph storage.

SUMMARY

Embodiments of the present disclosure seek to solve at least one of the problems existing in the related art to at least some extent.

Accordingly, an objective of the present disclosure is to provide a method for querying the shortest path of a graph.

Another objective of the present disclosure is to provide an apparatus for querying the shortest path of a graph.

Another objective of the present disclosure is to provide a computer readable storage medium.

In order to achieve the above objectives, embodiments of the present disclosure provide a method for querying the shortest path of a graph. The method includes: performing a breadth-first search in a distributed graph database with a start entity to be searched and an end entity to be searched as root nodes respectively, and obtaining a layer of new entities for each search; performing an intersection checking on the new entities and entities of the highest layer from a search set on an opposite side, so as to determine whether an intersection between the new entities and the entities of the highest layer exists; and when the intersection exists, determining intersection points, and performing path backtracking through the intersection points to find the shortest path from the start entity to the end entity.

Embodiments of the present disclosure provide an apparatus for querying the shortest path of a graph. The apparatus includes: one or more processors; a memory storing instructions executable by the one or more processors; in which the one or more processors are configured to: perform a breadth-first search in a distributed graph database with a start entity to be searched and an end entity to be searched as root nodes respectively, and obtain a layer of new entities for each search; perform an intersection checking on the new entities and entities of the highest layer from a search set on an opposite side, so as to determine whether an intersection between the new entities and the entities of the highest layer exists; and when the intersection exists, determine intersection points, and perform path backtracking through the intersection points to find the shortest path from the start entity to the end entity.

Embodiments of the present disclosure provide a non-transitory computer-readable storage medium storing computer instructions, the computer instructions are configured to cause the computer to implement a method for querying the shortest path of a graph, and the method includes: performing a breadth-first search in a distributed graph database with a start entity to be searched and an end entity to be searched as root nodes respectively, and obtaining a layer of new entities for each search; performing an intersection checking on the new entities and entities of the highest layer from a search set on an opposite side, so as to determine whether an intersection between the new entities and the entities of the highest layer exists; and when the intersection exists, determining intersection points, and performing path backtracking through the intersection points to find the shortest path from the start entity to the end entity.

Additional effects of the foregoing optional manners will be described below with reference to specific embodiments.

BRIEF DESCRIPTION OF THE DRAWINGS

The drawings are used to better understand this solution, and do not constitute a limitation on this disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Embodiment 1

Figure 1:
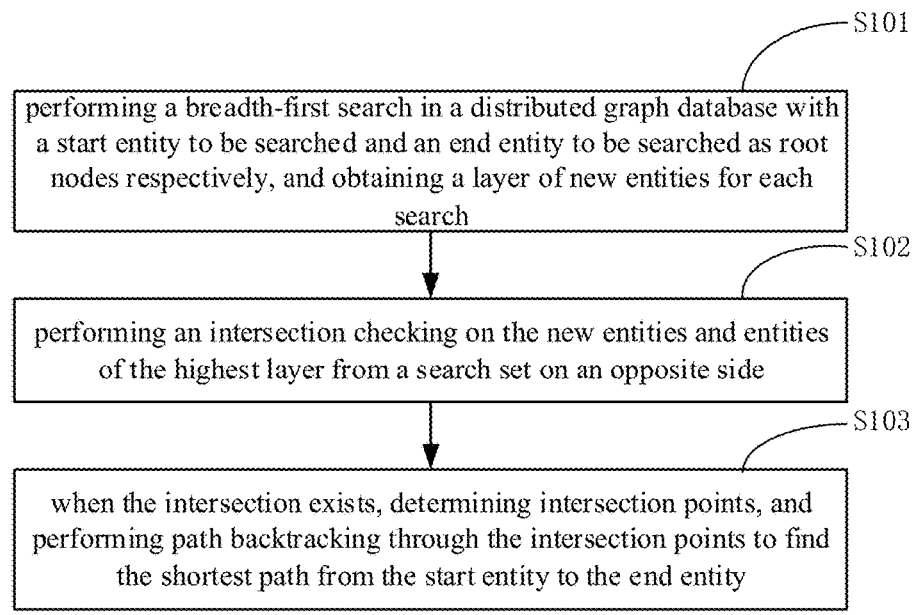
FIG. 1 is a schematic diagram according to Embodiment 1 of the present disclosure.

FIG. 1 is a schematic diagram according to Embodiment 1 of the present disclosure. As illustrated in FIG. 1, the method for querying the shortest path of a graph includes the following steps.

At step S101, a breadth-first search is performed in a distributed graph database with a start entity to be searched and an end entity to be searched as root nodes respectively, and a layer of new entities is obtained for each search.

For example, it is assumed that the method for querying the shortest path of a graph in the embodiments of the present disclosure is applied to a distributed graph database, and a function of querying the shortest path of a distributed graph database in a knowledge graph is realized. Optionally, the breadth-first search is performed in the distributed graph database with the start entity to be searched and the end entity to be searched as the root nodes respectively, and a layer of new entities is obtained for each search.

In other words, when querying graph data, the predetermined start entity and the end entity in the graph data can be determined first, and the breadth-first search is performed in the distributed graph database with the start entity to be searched and the end entity to be searched as the root nodes respectively. For example, a breadth-first search is performed in a distributed graph database in an asynchronous serial manner with the predetermined start entity and the end entity as the root nodes respectively. In other words, a first degree neighbor entity search is performed in the distributed graph database with the predetermined start entity as the root node, and then the first degree neighbor entity search is performed in a distributed graph database with the predetermined end entity as the root node, that is, the breadth-first search is performed in the distributed graph database with the start entity and the end entity in turn. As another example, a greedy search is performed in a distributed graph database with the start entity and the end entity as the root nodes respectively by adopting the thread blocking message queue to perform a two-way breadth-first search in parallel. The specific implementation process refers to the description of the subsequent embodiments.

At step S102, an intersection checking is performed on the new entities and entities of the highest layer from a search set on an opposite side, so as to determine whether an intersection between the new entities and the entities of the highest layer exists.

In other words, a two-way breadth-first search is performed in a distributed graph database with the predetermined start entity and end entity as the root nodes, and a layer of new entities is obtained for each search. An intersection checking may be performed on the layer of new entities obtained in this search and the entities of the highest layer from the search set on the opposite side, so as to determine whether an entity intersection between the new entities obtained in this search and the entities of the highest layer from the search set on the opposite side exists. For example, if the search is performed on the side of the start entity at this time, an intersection checking is performed on the layer of new entities obtained on the side of the start entity in this search and entities of the highest layer from a search set on an opposite side (i.e., a side of the end entity) to determine whether the entity intersection exists. When the intersection exists, step S103 is executed; otherwise, a search for a next layer of neighbor entities is performed until the maximum number of search paths is reached or the shortest path is found.

At step S103, when the intersection exists, intersection points are determined, and path backtracking is performed through the intersection points to find the shortest path from the start entity to the end entity.

In other words, when the intersection between the new entities newly obtained and entities of the highest layer from the search set on the opposite side exists, intersection points in the intersection (that is, entities in all intersections) can be determined and path backtracking is performed through the intersection points to find the shortest path from the start entity to the end entity.

As an example, when the intersection between the obtained new entities and entities of the highest layer from the search set on the opposite side exists, the intersection points in the intersection are determined, and a depth-first search is applied to perform two-way backtracking on the intersection points to find paths from the start entity to the intersection points and paths from the intersection points to the end entity, and then enumerated splicing is performed on the paths from the start entity to the intersection points and the paths from the intersection points to the end entity (i.e., each of the paths from the start entity to the intersection points is spliced with each of the paths from the intersection points to the end entity), to obtain the shortest path from the start entity to the end entity.

Figure 2:
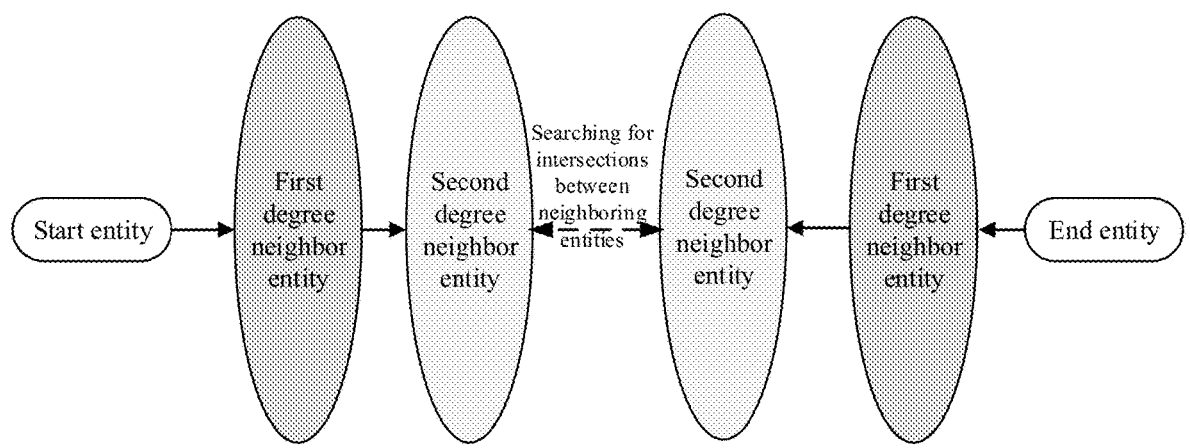
FIG. 2 is a schematic diagram according to Embodiment 2 of the present disclosure.

It can be seen that the present disclosure implements a query of the shortest path between the start entity to be searched and the end entity to be searched in a distributed graph database by using a two-way breadth-first search as a basic algorithm. The basic principle of the algorithm is shown in FIG. 2. The breadth-first search is performed in a distributed graph database with a start entity to be searched and an end entity to be searched as root nodes respectively, and a layer of new entities is obtained for each search. An intersection checking is performed on the new entities and entities of the outermost (the highest) layer from a search set on an opposite side, when an intersection between the new entities and the entities of the highest layer exists, it means that the shortest path from the start entity to the end entity exists. During the search process, the mapping relation between the current layer and the next layer is maintained to guarantee that a path can be found by backtracking from the current layer to the prior layer. Therefore, the shortest path from the start entity to the end entity can be found by path backtracking through the intersection points. The method greatly reduces the exponential growth of entities from the search layer by simultaneously searching on both sides, thereby improving the search efficiency of the shortest path, and satisfying the technical effects of efficient mining in the case of distributed graph storage.

Embodiment 2

Figure 3:
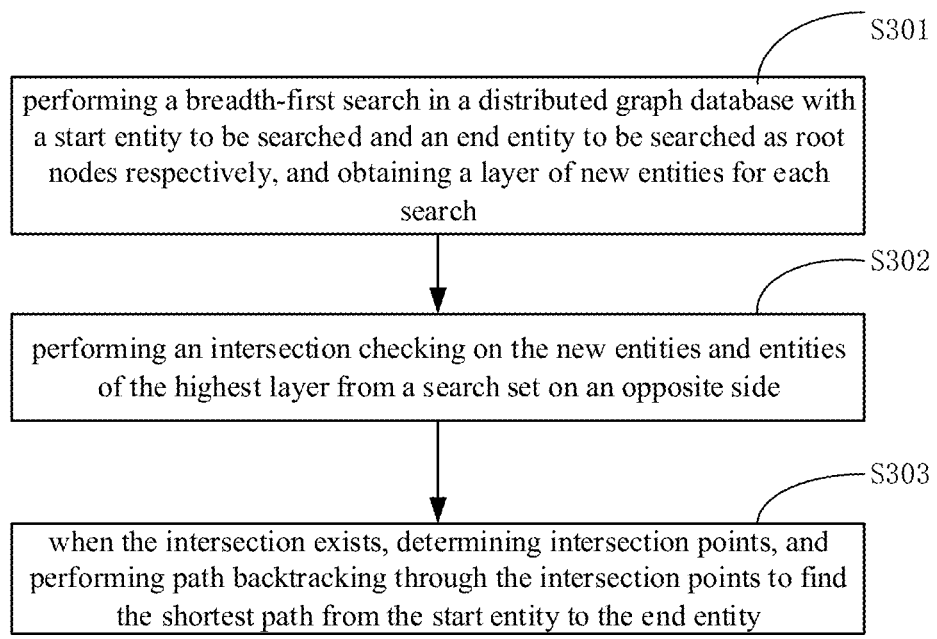
FIG. 3 is a schematic diagram according to Embodiment 2 of the present disclosure.

FIG. 3 is a schematic diagram according to Embodiment 2 of the present disclosure. As illustrated in FIG. 3, the method for querying the shortest path of a graph includes the following steps.

At step S301, a breadth-first search is performed in a distributed graph database alternatively with a start entity to be searched and an end entity to be searched as root nodes respectively, and a layer of new entities is obtained for each search.

Optionally, a breadth-first search is performed in a distributed graph database in an asynchronous serial manner with the predetermined start entity and the end entity as the root nodes respectively. In other words, a first degree neighbor entity search is performed in the distributed graph database with the predetermined start entity as the root node, and then the first degree neighbor entity search is performed in a distributed graph database with the predetermined end entity as the root node, that is, a breadth-first search is performed alternately with the iteration start node and end node of the algorithm, and a layer of new entities is obtained at each iteration, which is used for intersection checking with the entities of the highest layer from a search set on an opposite side.

For example, the search for layers is performed in a distributed graph database alternately in a multi-threaded asynchronous manner with the start entity to be searched and the end entity to be searched as root nodes respectively. In detail, a main thread and a thread pool are created, an entity request is determined when the breadth-first search is performed on the current layer of entities in the distributed graph database with the start entity or the end entity as a root node, an entity request of searching for the current layer is divided into a plurality of batch processing requests through the main thread, and the plurality of batch processing requests are allocated to each thread in the thread pool for execution. Multi-threaded barriers are set on the main thread, and returning of search entities of each thread are waited through the multi-threaded barriers, and it is determined that the search for the current layer is completed after all threads return.

In other words, based on the two-way breadth-first search algorithm, the search process is extended to multiple threads to optimize the process. In the specific process, a main thread can be used to handle the integration of data and search data. Each search on a side of the start entity and on a side of the end entity adopts the thread pool method. The entity request of searching for each layer is divided into a plurality of requests for each thread in the thread pool for execution. Multi-threaded barriers are set on the main thread to wait for returning of search entities of each thread, and it is determined that the search for the current layer is completed after all threads return, and the main thread is allowed to pass the multi-threaded barriers. Iteration is repeated alternately until the maximum number of search paths is reached or the shortest path is found.

For example, the main thread and thread pool may be created first, and then by preferentially taking a breadth-first search on the side of the start entity as an example, an entity request when the breadth-first search is performed on the current layer of entities in the distributed graph database with the start entity as a root node can be determined first. For example, if there are 100 entities in the current layer, it can be determined that there are 100 entity requests during the breadth-first search of the entities in the current layer, and there are 25 defined batches, thus the main thread uses 4 threads to divide the 100 requests, and each thread handles the search of neighbor entities of the next layer of the 25 entities. After the main thread sends the request to the corresponding thread, the main thread can set up a multi-threaded barrier, so that the multi-threaded barrier can wait for the return of search entities of each thread, and after all threads return, it is determined that the current layer on the side of the start entity is searched.

At step S302, an intersection checking is performed on the new entities and entities of the highest layer from a search set on an opposite side, so as to determine whether an intersection between the new entities and the entities of the highest layer exists.

In other words, when a two-way breadth-first search is performed in a distributed graph database alternately with the predetermined start entity to be searched and the end entity to be searched as root nodes respectively, and a layer of new entities is obtained for each search, an intersection checking on the new entities and entities of the highest layer from a search set on an opposite side, so as to determine whether an intersection between the new entities and the entities of the highest layer from the search set on the opposite side exists. For example, taking the layer of new entities obtained from the search on the side of the start entity as an example, if the search is performed on the side of the start entity at this time, an intersection checking is performed on the layer of new entities obtained on the side of the start entity in this search and entities of the highest layer from a search set on an opposite side (i.e., a side of the end entity) to determine whether the entity intersection exists. When the intersection exists, step S303 is executed; otherwise, a search for a next layer of neighbor entities is performed until the maximum number of search paths is reached or the shortest path is found.

At step S303, when the intersection exists, intersection points are determined, and path backtracking is performed through the intersection points to find the shortest path from the start entity to the end entity.

In other words, when the intersection between the new entities newly obtained and entities of the highest layer from the search set on the opposite side exists, intersection points in the intersection (that is, entities in all intersections) can be determined and path backtracking is performed through the intersection points to find the shortest path from the start entity to the end entity.

As an example, when the intersection between the obtained new entities and entities of the highest layer from the search set on the opposite side exists, the intersection points in the intersection are determined, and a depth-first search is applied to perform two-way backtracking on the intersection points to find paths from the start entity to the intersection points and paths from the intersection points to the end entity, and then enumerated splicing is performed on the paths from the start entity to the intersection points and the paths from the intersection points to the end entity (i.e., each of the paths from the start entity to the intersection points is spliced with each of the paths from the intersection points to the end entity), to obtain the shortest path from the start entity to the end entity.

Figure 4:
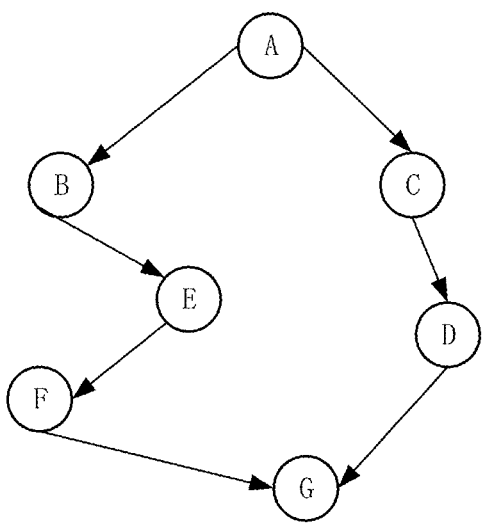
FIG. 4 is a diagram illustrating an example of a relation between graph data entities according to an embodiment of the present disclosure.

For example, FIG. 4 is an example graph of graph data. It is assumed that the entity A is a start entity to be searched and the entity G is an end entity to be searched. Taking the start entity A to be searched and the end entity G to be searched as root nodes respectively, a breadth-first search is alternately performed in the graph data in an asynchronous serial manner to obtain the shortest path from the start entity A to the end entity G. The specific process is as follows. Assuming that the search is performed on a side of the start entity first, after that, the search is performed on a side of the end entity, that is, the main thread may send a request of the first layer of neighbor entities of the start entity A to the thread pool to make the thread pool perform an entity search based on the request and return the corresponding search results. For example, the first search is performed on the side of the start entity, the first layer of neighbor entities B and C of the start entity A are obtained, and when the main thread determines that the search of this layer of neighbor entities on the side of the start entity is completed, an intersection checking is performed on the neighbor entities of the highest layer on the side of the start entity and the neighbor entities of the highest layer on the side of the end entity. Currently, the highest layer of the end entity G is the current layer itself, so there is no intersection, and then a search is performed on the next layer of the end entity G, and entities F and D are obtained. The intersection checking is performed on the neighbor entities B and C of the highest layer on the side of the start entity A and the neighbor entities F and D of the highest layer on the side of the end entity G, and there is no intersection. After that, the search is performed on neighbor entities of a further next layer on the side of the start entity A, and entities E and D are obtained. At this time, an intersection checking is performed on the neighbor entities E and D of the highest layer of the start entity A and neighbor entities F and D of the highest layer of the side of the end entity G, an intersection D is obtained, and finally a path A→C→D and a path D→G are obtained through backtracking toward the start entity A and the end entity G respectively. The two paths are combined to obtain the shortest path A→C→D→G from the start entity A to the end entity G.

Therefore, a breadth-first search is performed alternatively in a distributed graph database with a start entity to be searched and an end entity to be searched as root nodes respectively, and a layer of new entities is obtained for each search, an intersection checking is performed on the new entities and entities of the highest layer from a search set on an opposite side, when the intersection between the new entities and the entities of the highest layer exists, the shortest path from the start entity to the end entity can be found by path backtracking through the intersection points. When the intersection does not exist, the search is repeated until the maximum number of search paths is reached or the shortest path is found. In the embodiment of the present disclosure, a multi-threaded asynchronous search method can be used to asynchronously split the relational search to achieve the effect of simultaneous search, which accelerates the search speed of each layer of entities. This search method in the distributed graph database greatly improves the search the performance of each layer.

Embodiment 3

Figure 5:
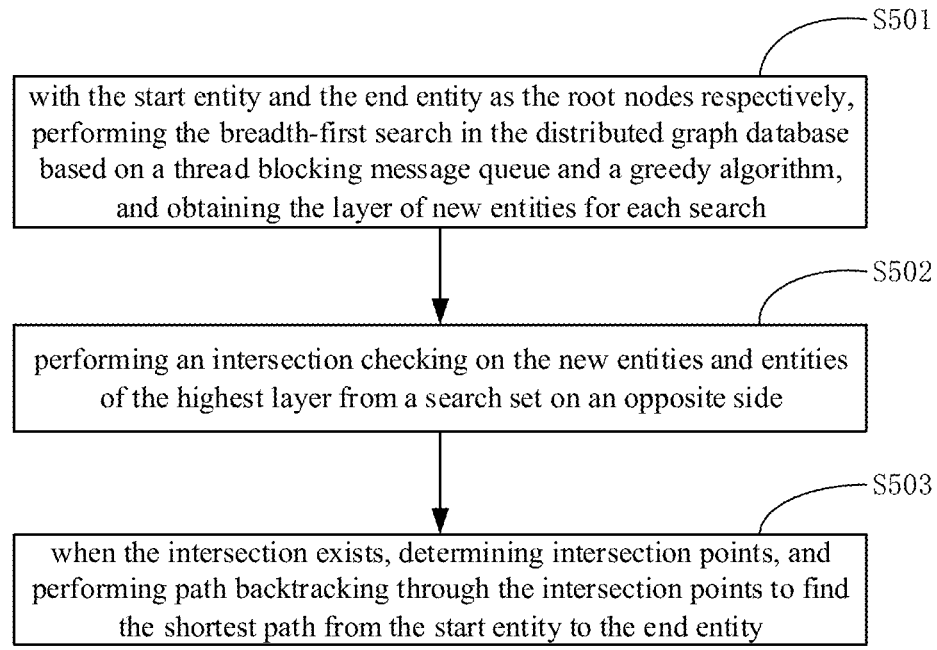
FIG. 5 is a schematic diagram according to Embodiment 3 of the present disclosure.

FIG. 5 is a schematic diagram according to Embodiment 3 of the present disclosure. As illustrated in FIG. 5, the method for querying the shortest path of a graph includes the following steps.

At step S501, with the start entity and the end entity as the root nodes respectively, the breadth-first search is performed in the distributed graph database based on a thread blocking message queue and a greedy algorithm, and the layer of new entities is obtained for each search.

Optionally, a greedy search is performed in a distributed graph database by using a thread blocking message queue with a start entity to be searched and an end entity to be searched as root nodes respectively, so as to completely parallelize the two-way breadth-first search. As an example, a main thread and a thread pool are created, an entity request when the breadth-first search is performed on a current layer of entities in the distributed graph database with the start entity or the end entity as a root node is determined, and an entity request for searching the current layer on a side of the start entity and an entity request for searching the current layer on a side of the end entity are allocated respectively to corresponding thread pools for execution through the main thread, and a blocking message queue is applied to read a new layer of entities through the main thread, in which the layer of new entities is obtained when a thread pool on the side of the start entity or a thread pool on the side of the end entity preferentially completes the breadth-first search of the current layer of entities.

In other words, in the main thread, entity access request of the current layer is initiated for each thread corresponding to the side of the start entity and each thread corresponding to the side of the end entity, and the thread task communication between the main thread and the thread pool is s through a blocking queue. When the entities of the layer on either the side of the start entity or the side of the end entity are searched, the thread pool completes the accumulation through the atomic counter and finally determines whether the current layer search is completed. If it is determined that the search for the current layer is completed, the information of the search on the current side being completed is added to the blocking queue. The main thread consumes the blocking queue and performs blocking, so that the main thread obtains a new layer of entities after the current search is completed, and performs an intersection checking on the new entities of the current side and entities of the highest layer of the search set on the opposite side. At step S502, an intersection checking is performed on the new entities and entities of the highest layer from a search set on an opposite side.

In other words, a two-way breadth-first search is performed in a distributed graph database with the predetermined start entity and end entity as the root nodes, and a layer of new entities is obtained for each search. An intersection checking may be performed on the layer of new entities obtained in this search and the entities of the highest layer from the search set on the opposite side, so as to determine whether an entity intersection between the new entities obtained in this search and the entities of the highest layer from the search set on the opposite side exists. For example, if the search is performed on the side of the start entity at this time, an intersection checking is performed on the layer of new entities obtained on the side of the start entity in this search and entities of the highest layer from a search set on an opposite side (i.e., a side of the end entity) to determine whether the entity intersection exists. When the intersection exists, step S503 is executed; otherwise, a search for a next layer of neighbor entities is performed until the maximum number of search paths is reached or the shortest path is found.

At step S503, when the intersection exists, intersection points are determined, and path backtracking is performed through the intersection points to find the shortest path from the start entity to the end entity.

In other words, when the intersection between the new entities newly obtained and entities of the highest layer from the search set on the opposite side exists, intersection points in the intersection (that is, entities in all intersections) can be determined and path backtracking is performed through the intersection points to find the shortest path from the start entity to the end entity.

As an example, when the intersection between the obtained new entities and entities of the highest layer from the search set on the opposite side exists, the intersection points in the intersection are determined, and a depth-first search is applied to perform two-way backtracking on the intersection points to find paths from the start entity to the intersection points and paths from the intersection points to the end entity, and then enumerated splicing is performed on the paths from the start entity to the intersection points and the paths from the intersection points to the end entity (i.e., each of the paths from the start entity to the intersection points is spliced with each of the paths from the intersection points to the end entity), to obtain the shortest path from the start entity to the end entity.

Figure 6:
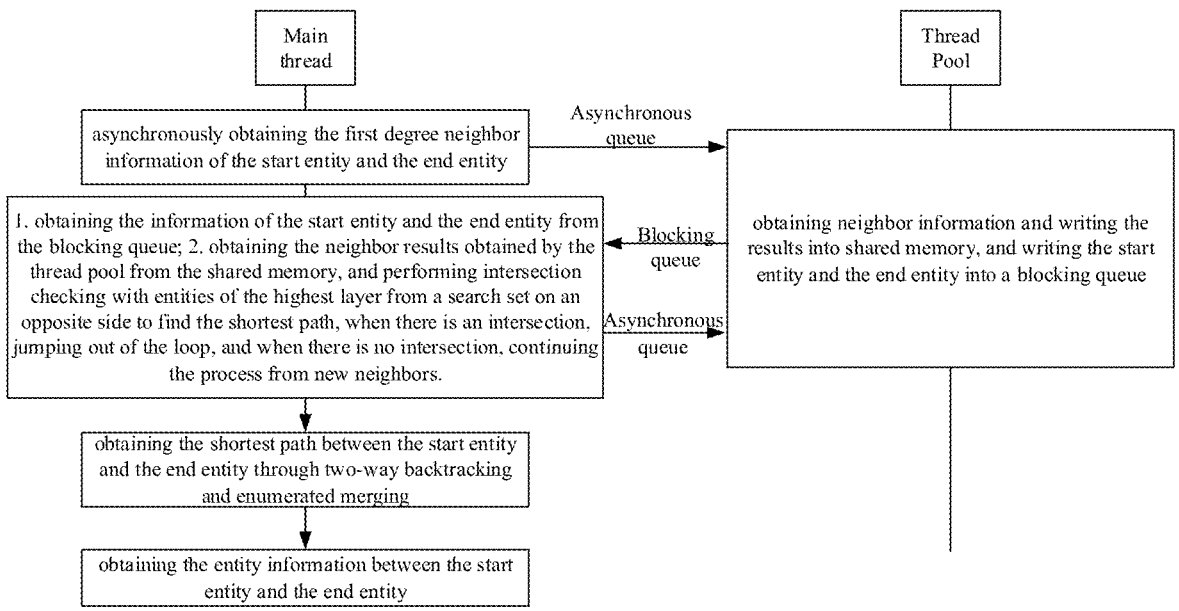
FIG. 6 is an example diagram of thread interaction according to an embodiment of the present disclosure.

For example, FIG. 6 is a schematic diagram of thread interaction according to the embodiment of the present disclosure. The main thread sends a request of asynchronously obtaining the information of the start entity and the end entity to the thread pool. The thread pool obtains neighbor information based on the request and writes the results to shared memory, and writes the start entity and the end entity to a blocking queue. The main thread obtains the information of the start entity and the end entity through the blocking queue, and obtains the neighbor results obtained by the thread pool from the shared memory, and performs intersection checking with entities of the highest layer from a search set on an opposite side to find the shortest path. When there is an intersection, it may be controlled to jump out the loop (in other words, the process is completed), and when there is no intersection, it may be controlled to continue the process from new neighbors (in other words, the process is repeated from new neighbors). When it is determined that there is an intersection, the shortest path between the start entity and the end entity is obtained through two-way backtracking and enumerated merging, and the entity information between the start entity and the end entity is obtained based on the shortest path.

Figure 7:
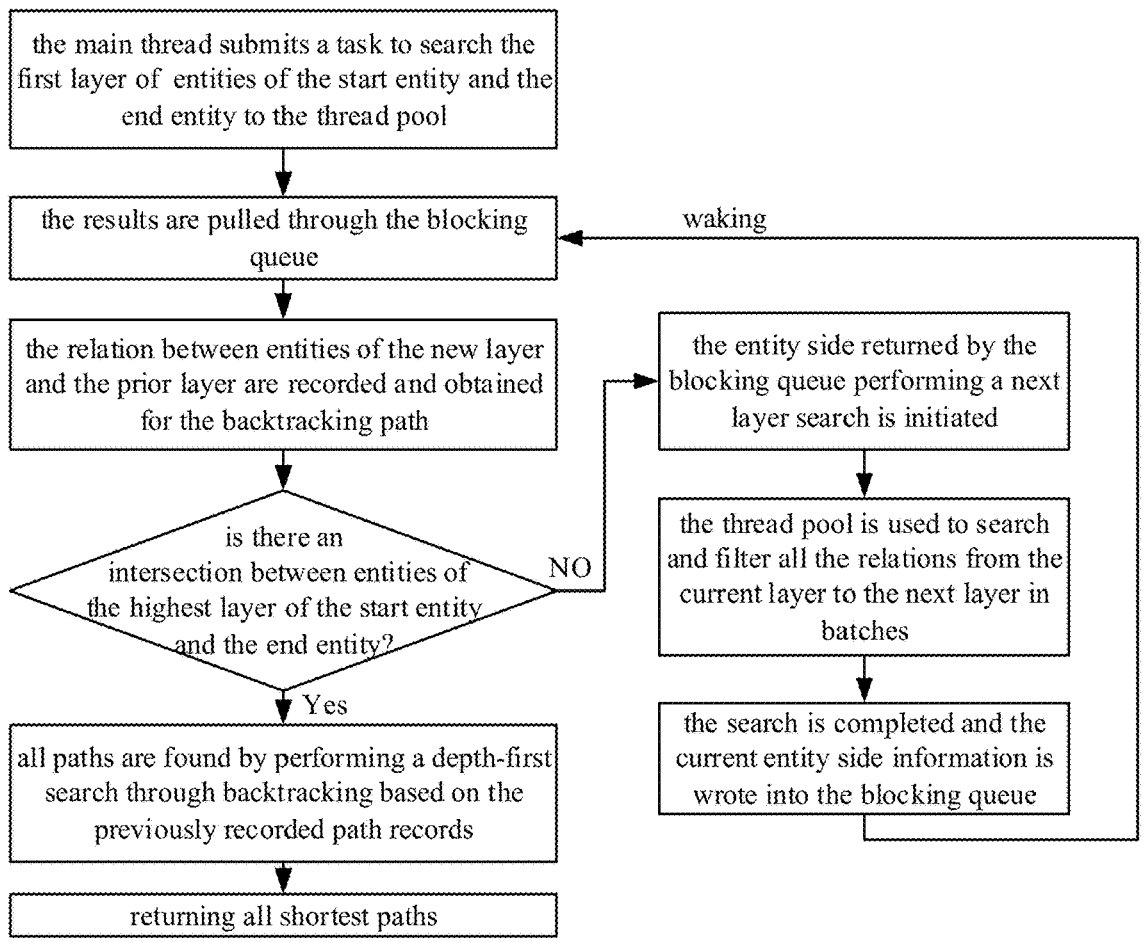
FIG. 7 is a schematic diagram according to Embodiment 4 of the present disclosure.

In order to facilitate understanding of the embodiments of the present disclosure, examples are described below with reference to FIGS. 4 and 7. FIG. 4 is an example diagram of graph data. It is assumed that the entity A is a start entity to be searched and the entity G is an end entity to be searched. Taking the start entity A to be searched and the end entity G to be searched as the root nodes respectively, a breadth-first search is performed in the distributed graph database based on the thread blocking message queue and the greedy algorithm to obtain the shortest path from the entity A to the end entity G. The specific process is as follows. The main thread submits a task to search the neighbor entities of the first layer of the start entity A and the end entity G to the thread pool. The thread pool searches the corresponding entity based on the search request and returns the search results. The main thread pulls search results through the blocking queue. When the thread pool performs the search for the current layer entities, the relation between entities of the new layer and the prior layer can also be obtained for backtracking path. When the main thread obtains the searched information of the entities on the current side through the blocking message queue, the intersection checking is performed on the entities of the highest layer on the side of the start entity and on the side of the end entity to determine whether there is an intersection. If an intersection exists, based on the previously obtained entity relation, a depth-first search is performed on intersection points by backtracking towards the start point and the end point. For example, the intersection point is C, the start point is A, and the end point is B. All the paths from A to C and all the paths from C to B are found, and finally the two paths are enumerated to obtain the shortest path. If there is no intersection, the entity side returned by the blocking queue performing the search on the next layer is initiated, and the thread pool is used to search and filter all the relations from the current layer to the next layer in batches, and write the information on the current entity side to the blocking queue when the search is completed.

For example, the main thread submits a task to search entities of the first layer of the start entity A and the end entity G to the thread pool. Assuming that the search on entities of the first layer of the start entity A is completed first, the information of the start entity A is written into the blocking queue. The main thread consumes the blocking queue and performing blocking. According to the start entity A in the blocking queue, neighbor entity B, C of the highest layer of the start entity A are found. At this time, an intersection checking is performed on the entity B, C and entities of the highest layer of the end entity G (since the end entity G has not completed the search of entities of the current layer, the entities of the highest layer of the end entity G is itself), and there is no intersection, then the side on which the search is currently completed (that is, the side of the start entity) further initiate a search for entities of the next layer of on the thread pool. That is, by accumulation through the atomic counter in the thread pool, finally it is determined whether the search on the current layer is completed, if it is completed, the search information on one side is added to the blocking queue. At this time, the main thread consumes and the blocking queue and performs blocking, and the main thread compares entities of the highest layer on both sides to see if there is an intersection. If so, the intersection point is traced back to the end point and the start point respectively to find the corresponding shortest path. Because there may be a plurality of shortest paths, it is required to enumerated splice all paths forward and backward from the intersection point to obtain all the shortest paths. If there is no intersection, the side on which the search is currently completed further initiate a search for neighbor entities of the next layer on the thread pool. It can be seen that in this process, there is competition between two sub-threads and the search that complete the search on the current layer returns first. That is, by preferentially using the current fastest way to search the search layer, it is possible to avoid fluctuations in the storage cluster network that affect the search speed, which greatly improves the search efficiency of the shortest path, and satisfies the efficient mining in the case of distributed graph storage.

It should be noted that, in the embodiments of the present disclosure, the index structure of entities and relations, and the data may be stored using an Elastic search (a highly scalable open source search engine) index structure. This disclosure makes full use of the combination of Elastic search forward index and inverted index to perform a breadth-first search for layer searches. Relations can be stored in SPO (a file format), so a relation includes the start point id (from) and the end point id (to), and the type of relation. When performing a breadth-first search for each layer, this disclosure actually gives the entity id set of the current layer as from, and issues it to all cluster storage machines that store related relations for matching. The match of each machine uses the from set to find all matches from the inverted indexes. Each from maps a set of relational ids. Finally, as long as all the id sets are combined, all the qualified relations on the machine are known, because the inverted index query and the union set query do not involve TO operations, this step is very fast. Searching for ids for related relation do not search for the current relation returned, because the relation carries additional information that may not be needed in the search process, so the forward index of Elastic search is used to complete the return of the search results. The relation id just searched out are mapped by a forward row to map its corresponding end id, so this forward index is used to finally find and return all the ids of the next search entity. The combination of the above two processes greatly reduces the overhead of redundant data of network TO transmission, and ensures that the corresponding relation set can be found quickly.

Figure 8:
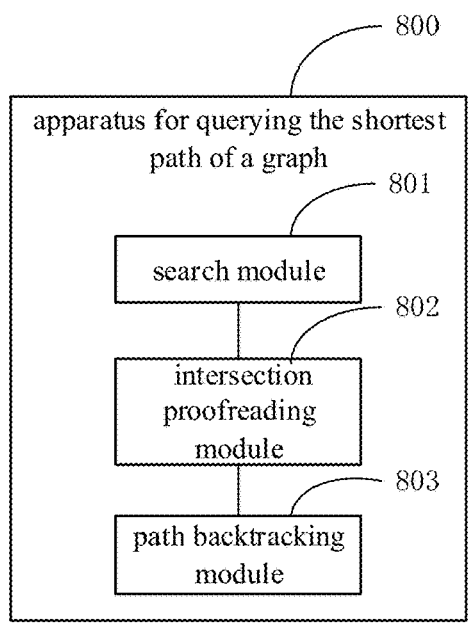
FIG. 8 is a schematic diagram according to Embodiment 5 of the present disclosure.

Corresponding to the method for querying the shortest path of a graph according to the foregoing embodiments, an embodiment of the present disclosure further provides an apparatus for querying the shortest path of a graph. The method for querying the shortest path of a graph according to the foregoing embodiments corresponds to the apparatus for querying the shortest path of a graph according to the foregoing embodiments, so the implementation of the method for querying the shortest path of a graph is also applicable to the apparatus for querying the shortest path of a graph provided in this embodiment, which is not be described in detail in this embodiment. FIG. 8 is a schematic diagram according to Embodiment 5 of the present disclosure. As illustrated in FIG. 8, the apparatus for querying the shortest path of a graph 800 includes: a search module 801, an intersection proofreading module 802, and a path backtracking module 803.

In detail, the search module 801 is configured to perform a breadth-first search in a distributed graph database with a start entity to be searched and an end entity to be searched as root nodes respectively, and obtain a layer of new entities for each search.

For example, the search module 801 is configured to perform the breadth-first search in the distributed graph database alternatively with the start entity to be searched and the end entity to be searched as the root nodes respectively. In detail, the search module 801 is configured to: create a main thread and a thread pool; determine an entity request when the breadth-first search is performed on a current layer of entities in the distributed graph database with the start entity or the end entity as a root node; divide an entity request for searching the current layer into a plurality of batch processing requests through the main thread, and allocate the plurality of batch processing requests to each thread in the thread pool for execution; and set multi-threaded barriers on the main thread, wait for returning of search entities of each thread through the multi-threaded barriers, and determine that the current layer is searched after all threads return.

As another example, the search module 801 is configured to: with the start entity and the end entity as the root nodes respectively, perform the breadth-first search in the distributed graph database based on a thread blocking message queue and a greedy algorithm, and obtain the layer of new entities for each search. In detail, the search module 801 is configured to create a main thread and a thread pool; determine an entity request when the breadth-first search is performed on a current layer of entities in the distributed graph database with the start entity or the end entity as a root node; allocate an entity request for searching the current layer on aside of the start entity and an entity request for searching the current layer on a side of the end entity respectively to corresponding thread pools for execution through the main thread; and apply a blocking message queue to read a new layer of entities through the main thread, in which the layer of new entities is obtained when a thread pool on the side of the start entity or a thread pool on the side of the end entity preferentially completes the breadth-first search of the current layer of entities.

The intersection proofreading module 802 is configured to perform an intersection checking on the new entities and entities of the highest layer from a search set on an opposite side, so as to determine whether an intersection between the new entities and the entities of the highest layer exists.

The path backtracking module 803 is configured to when the intersection exists, determine intersection points, and perform path backtracking through the intersection points to find the shortest path from the start entity to the end entity. Optionally, the path backtracking module 803 is configured to: apply a depth-first search to perform two-way backtracking on the intersection points to find paths from the start entity to the intersection points and paths from the intersection points to the end entity; and perform enumerated matching on the paths from the start entity to the intersection points and the paths from the intersection points to the end entity, to obtain the shortest path from the start entity to the end entity.

According to an embodiment of the present disclosure, the present disclosure further provides an electronic device and a readable storage medium.

Figure 9:
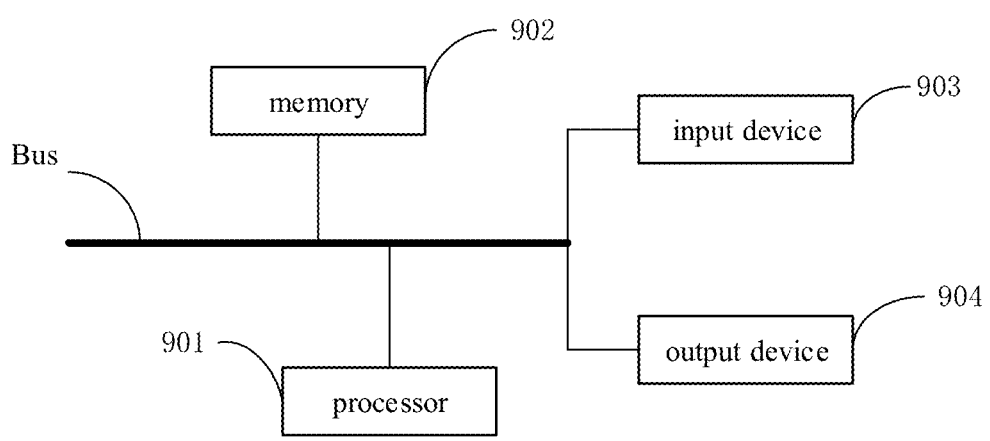
FIG. 9 is a block diagram of an electronic device for implementing a method for querying the shortest path of a graph according to an embodiment of the present disclosure.

FIG. 9 is an electronic device for implementing a method for querying the shortest path of a graph according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the electronic device includes: one or more processors 901, a memory 902, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 901 is taken as an example in FIG. 9.

The memory 902 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the voice control method according to the present disclosure.

As a non-transitory computer-readable storage medium, the memory 902 is configured to store non-transitory software programs, non-transitory computer executable programs and modules, such as program instructions/modules corresponding to the method for querying the shortest path of a graph in the embodiment of the present disclosure (For example, the search module 801, the intersection proofreading module 802, and the path backtracking module 803 shown in FIG. 8). The processor 901 executes various functional applications and data processing of the server by running non-transitory software programs, instructions, and modules stored in the memory 902, that is, implementing the method for querying the shortest path of a graph in the foregoing method embodiment.

The memory 902 may include a storage program area and a storage data area, where the storage program area may store an operating system and application programs required for at least one function. The storage data area may store data created according to the use of the electronic device, and the like. In addition, the memory 902 may include a high-speed random access memory, and a non-transitory memory, such as at least one magnetic disk storage device, a flash memory device, or other non-transitory solid-state storage device. In some embodiments, the memory 902 may optionally include a memory remotely disposed with respect to the processor 901, and these remote memories may be connected to the electronic device through a network. Examples of the above network include, but are not limited to, the Internet, an intranet, a local area network, a mobile communication network, and combinations thereof.

The electronic device of the method for querying the shortest path of a graph may further include an input device 903 and an output device 904. The processor 901, the memory 902, the input device 903, and the output device 904 may be connected through a bus or in other manners. In FIG. 9, the connection through the bus is taken as an example.

The input device 903 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 904 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

An embodiment of the present disclosure provides a method for querying the shortest path of a graph, which includes: determining a start entity to be searched and an end entity to be searched; performing a breadth-first search in a distributed graph database with the start entity to be searched and the end entity to be searched as root nodes respectively, to obtain intersection entities of the highest search layers of the start entity and the end entity; and performing path backtracking through the intersection entities to find the shortest path from the start entity to the end entity. This method is an alternative solution of the methods for querying the shortest path of a graph described in the above embodiments. Similar features are referring to the above embodiments, which will not be described in detail herein.

According to the technical solution of the embodiments of the present disclosure, a breadth-first search is performed in a distributed graph database with a start entity to be searched and an end entity to be searched as root nodes respectively, and a layer of new entities is obtained for each search, and then an intersection checking is performed on the new entities and entities of the highest layer from a search set on an opposite side, when the intersection exists, intersection points are determined, and path backtracking is performed through the intersection points to find the shortest path from the start entity to the end entity, due to the simultaneous search at both sides, the exponential growth of the entities of the search layer can be greatly alleviated, and the search efficiency of the shortest path is improved, which can meet the efficient mining in the case of distributed graph storage. The technical method of searching for the shortest path of graph data by using simultaneous searching at both sides is adopted to solve the problem that the exponential growth of time consumed in the shortest path query based on the one-way breadth-first search algorithm in the related art as the number of path layers increases, which can greatly reduce the exponential growth of entities of the search layer, thereby improving the search efficiency of the shortest path, and satisfying the technical effects of efficient mining in the case of distributed graph storage. In addition, based on the thread blocking message queue and greedy algorithm, the two-way breadth-first search is fully parallelized, and the search on the search layer is preferentially adopted in the current fastest way, which can avoid the problem that the storage cluster network fluctuations affect the search speed.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is no limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A method for querying the shortest path of a graph, comprising:
performing a breadth-first search in a distributed graph database with a start entity to be searched and an end entity to be searched as root nodes respectively, and obtaining a layer of new entities for each breadth-first search;
performing an intersection checking on the new entities and entities of the highest layer from a search set on an opposite side; and
in response to determining that an intersection between the new entities and entities of the highest layer exists, determining the shortest path from the start entity to the end entity by performing path backtracking through intersection points included in the intersection;
wherein performing the breadth-first search in the distributed graph database with the start entity to be searched and the end entity to be searched as the root nodes respectively comprising:
creating a main thread and a thread pool;
determining entity requests of performing a breadth-first search on a current layer of entities in the distributed graph database with the start entity or the end entity as a root node;
dividing by the main thread, the entity requests into a plurality of batches of processing requests, and executing by each thread in the thread pool, each batch of the processing requests;
setting multi-threaded barriers on the main thread, and in response to search entities for each batch of processing requests being returned by each thread through the multi-threaded barriers, determining that the search for the current layer is completed.

2. The method according to claim 1, performing the breadth-first search in the distributed graph database with the start entity to be searched and the end entity to be searched as the root nodes respectively comprising:
performing the breadth-first search in the distributed graph database alternatively with the start entity to be searched and the end entity to be searched as the root nodes respectively.

3. The method according to claim 1, performing the breadth-first search in the distributed graph database with the start entity to be searched and the end entity to be searched as the root nodes respectively comprising:
with the start entity and the end entity as the root nodes respectively, performing the breadth-first search in the distributed graph database based on a thread blocking message queue and a greedy algorithm.

4. The method according to claim 3, with the start entity and the end entity as the root nodes respectively, performing the breadth-first search in the distributed graph database based on a thread blocking message queue and a greedy algorithm further comprising:
determining a first entity request of performing a breadth-first search on a current layer of entities in the distributed graph database with the start entity as a root node, and determining a second entity request of performing a breadth-first search on a current layer of entities in the distributed graph database with the end entity as a root node;
allocating by the main thread, the first entity request to a first thread pool, and the second entity request to a second thread pool;
in response to the first thread pool completing execution of the first entity request earlier than the second thread pool, or in response to the second thread pool completing execution of the second entity request earlier than the first thread pool, obtaining a new layer of entities; and
reading by the main thread, the new layer of entities by applying a blocking message queue.

5. The method according to claim 1, determining the shortest path from the start entity to the end entity by performing path backtracking through the intersection points, comprising:
determining paths from the start entity to the intersection points and paths from the intersection points to the end entity by performing two-way backtracking on the intersection points with a depth-first search; and
determining the shortest path from the start entity to the end entity by performing enumerated matching on the paths from the start entity to the intersection points and the paths from the intersection points to the end entity.

6. An apparatus for querying the shortest path of a graph, comprising:
one or more processors;
a memory storing instructions executable by the one or more processors;
wherein the one or more processors are configured to:
perform a breadth-first search in a distributed graph database with a start entity to be searched and an end entity to be searched as root nodes respectively, and obtaining a layer of new entities for each breadth-first search;
perform an intersection checking on the new entities and entities of the highest layer from a search set on an opposite side; and in response to determining that an intersection between the new entities and entities of the highest layer exists, determine the shortest path from the start entity to the end entity by performing path backtracking through intersection points included in the intersection;

wherein the one or more processors are configured to:

create a main thread and a thread pool;

determine entity requests of performing a breadth-first search on a current layer of entities in the distributed graph database with the start entity or the end entity as a root node;

divide by the main thread, the entity requests into a plurality of batches of processing requests, and execute by each thread in the thread pool, each batch of the processing requests;

set multi-threaded barriers on the main thread, and in response to search entities for each of the batch processing requests being returned by each thread through the multi-threaded barriers, determine that the search for the current layer is completed.

7. The apparatus according to claim 6, wherein the one or more processors are configured to:

perform the breadth-first search in the distributed graph database alternatively with the start entity to be searched and the end entity to be searched as the root nodes respectively.

8. The apparatus according to claim 6, wherein the one or more processors are configured to:

with the start entity and the end entity as the root nodes respectively, perform the breadth-first search in the distributed graph database based on a thread blocking message queue and a greedy algorithm.

9. The apparatus according to claim 8, wherein the one or more processors are configured to:

determine a first entity request of performing a breadth-first search a current layer of entities in the distributed graph database with the start entity as a root node, and determine a second entity request of performing a breadth-first search on a current layer of entities in the distributed graph database with the end entity as a root node;

allocate by the main thread, the first entity request to a first thread pool first, and the second entity request to a second thread pool;

in response to the first thread pool completing execution of the first entity request earlier than the second thread pool, or in response to the second thread pool completing execution of the second entity request earlier than the first thread pool, obtain a new layer of entities; and read by the main thread, the new layer of entities by applying a blocking message queue.

10. The apparatus according to claim 6, wherein the one or more processors are configured to:

determine paths from the start entity to the intersection points and paths from the intersection points to the end entity by performing two-way backtracking on the intersection points with a depth-first search; and determine the shortest path from the start entity to the end entity by performing enumerated matching on the paths from the start entity to the intersection points and the paths from the intersection points to the end entity.

11. A non-transitory computer-readable storage medium storing computer instructions, wherein the computer instructions are configured to cause the computer to implement a method for querying the shortest path of a graph, and the method comprises:

performing a breadth-first search in a distributed graph database with a start entity to be searched and an end entity to be searched as root nodes respectively, and obtaining a layer of new entities for each breadth-first search;

performing an intersection checking on the new entities and entities of the highest layer from a search set on an opposite side; and in response to determining that an intersection between the new entities and entities of the highest layer exists, determining the shortest path from the start entity to the end entity by performing path backtracking through intersection points included in the intersection;

wherein performing the breadth-first search in the distributed graph database with the start entity to be searched and the end entity to be searched as the root nodes respectively comprising:

creating a main thread and a thread pool;

determining entity requests of performing a breadth-first search on a current layer of entities in the distributed graph database with the start entity or the end entity as a root node;

dividing by the main thread, the entity requests into a plurality of batches of processing requests, and executing by each thread in the thread pool, each batch of the processing requests;

setting multi-threaded barriers on the main thread, and in response to search entities for each of the batch processing requests being returned by each thread through the multi-threaded barriers, determining that the search for the current layer is completed.

* * * * *